Nov. 9, 1965     K. SCHROTER     3,216,220
OVERLOAD CLUTCH
Filed June 24, 1963     3 Sheets-Sheet 1

INVENTOR
KURT SCHROTER
BY Toulmin & Toulmin
ATTORNEYS

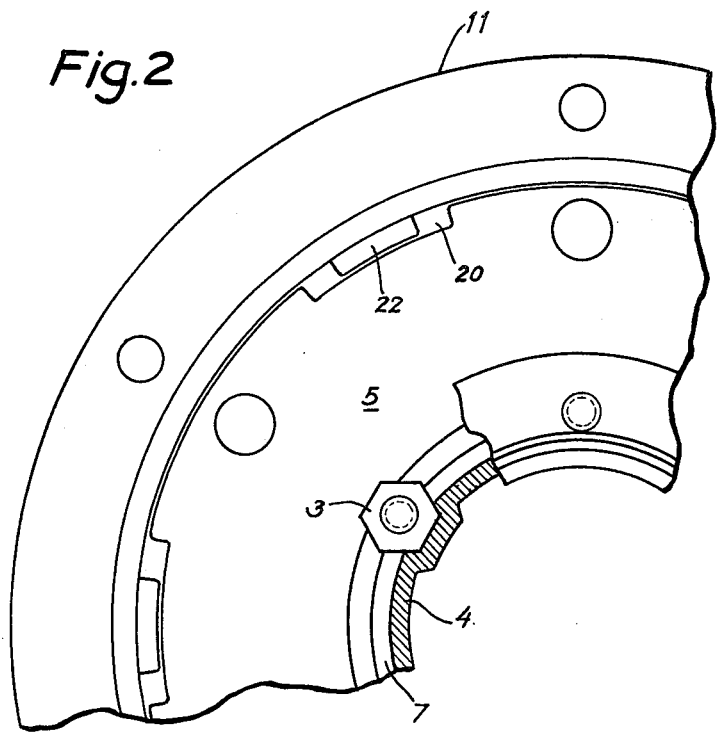
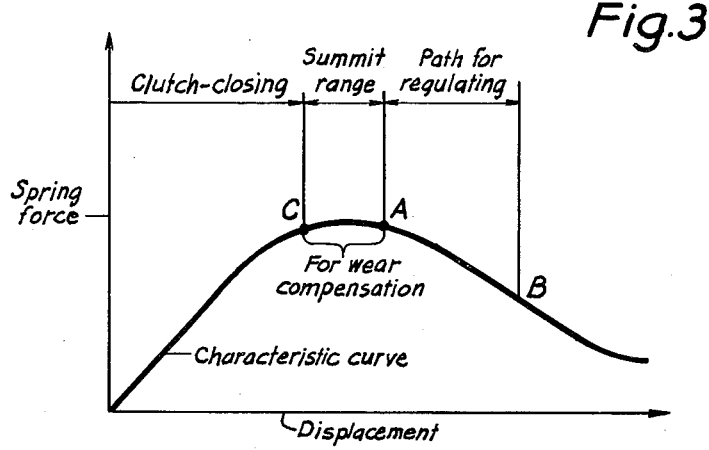

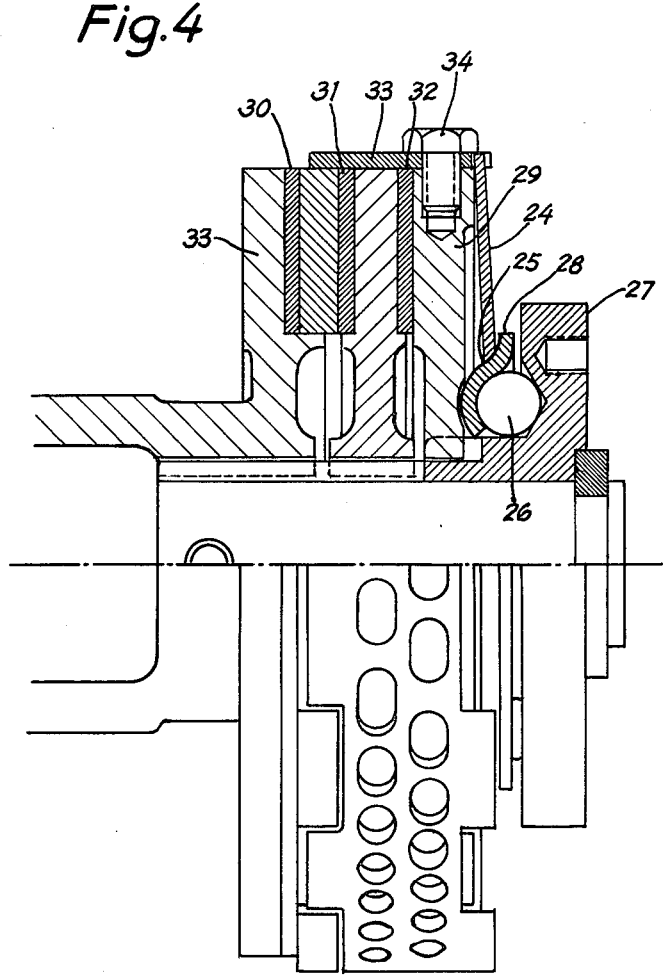

United States Patent Office 3,216,220
Patented Nov. 9, 1965

3,216,220
OVERLOAD CLUTCH
Kurt Schroter, Lohmar, Germany, assignor to Jean Walterscheid Kommanditgesellschaft, Lohmar, Germany
Filed June 24, 1963, Ser. No. 290,091
Claims priority, application Germany, July 3, 1962, W 32,531
10 Claims. (Cl. 64—30)

The present invention relates to an overload friction clutch, more particularly to such a clutch having a driving member upon which is rotatably mounted a driven member provided with friction surfaces with the driving member and driven member being drivingly engaged through the friction surface by resilient force.

When such friction clutches are used as overload clutches to limit the torque transmitted, the resilient force urging the friction surfaces into driving engagement is applied in such a manner that at maximum torque the resilient forces are just sufficient to transmit the torque. Upon exceeding this predetermined maximum torque, the friction surfaces will slip so that these surfaces are no longer in driving engagement.

Such known friction overload clutches have the disadvantage that it is virtually impossible to maintain the maximum torque transmitted within prescribed limits. This difficulty arises from the fact that the friction between the clutch members will change considerably during use. In addition, the friction surfaces may adhere to each other because of corrosion. Further, as a result of wear, the force exerted by the resilient members will vary so that with increased wear the limiting or maximum torque will decrease. While the forces exerted by the resilient members can be adjusted by retensioning the springs, this procedure is not always satisfactory because when the adjustment is undertaken carelessly the functioning of the clutch will be uncertain.

It has been proposed that by using springs with flat characteristic curves (resilient force displacement) in friction overload clutches, it may be possible to maintain constant spring pressure during wear of the clutch. However, such a construction would not adequately maintain constant maximum torque, particularly after any corrosion has occurred in the clutch.

It is therefore the principal object of the present invention to provide a novel and improved friction overload clutch.

It is a further object of the present invention to provide a friction overload clutch which transmits a constant maximum torque during the entire life of the clutch independent of varying friction or clutch wear, and under extremely unfavorable conditions produced by dirt or corrosion in the clutch.

The friction clutch of the present invention essentially comprises a driving member having a hub with a driven member being rotatably mounted on the hub. The driven member is provided with friction surfaces for frictional contact with pressure plates that are acted upon by plate springs. The pressure plates and plate springs have corresponding recesses with tangentially inclined bottoms with rolling members being positioned in pairs of corresponding recesses to transmit the force from the plate springs to the pressure plates. The plate springs are stressed in such a manner that the forces which they exert upon the pressure plates will decrease as the springs become more deformed. In their initial condition of minimum deformation, the plate springs will be capable of exerting approximately constant maximum forces over a finite range.

Another feature of this invention is that the maximum forces of the plate springs are not transmitted by the rolling members to the inclined surfaces of the recesses until 70–90% of the maximum torque transmittable by the clutch is exceeded.

Another feature of this invention is that the plate springs are provided with recesses which receive projections from the pressure plates so that the relative angular movement between the plate springs and pressure plates is limited. The spacing between different sets of recesses and projections is different so that the range of movement will be different on both sides of the clutch.

The friction clutch according to this invention assures a dependable limitation of the torque transmitted because the maximum torque that can be transmitted does not depend upon the amount of friction but only upon the initial force exerted by the plate spring. As a result, the limiting torque to be transmitted by the clutch will remain constant once this torque has been established by the initial tensioning of the plate springs. If this predetermined torque limit is exceeded, the plate springs will be further tensioned whereby the forces exerted by them will decrease until the clutch begins to slip. Wearing away of the friction surfaces will produce an insignificant change of the maximum spring forces because the springs will be relaxed somewhat in the summit range of the characteristic curve wherein the resilient force remains substantially constant despite varying displacement.

The friction clutch of the present invention has the further advantage that it operates with only a slight loss of power. This clutch also operates in a small amount of space and accordingly can be installed in virtually all desired applications.

Additional objects and advantages of the present invention will be apparent upon reference to the accompanying description when taken in conjunction with the following drawings, wherein:

FIGURE 2 is a partial end view of the clutch with a section thereof being taken along the line A–B of FIGURE 1;

FIGURE 3 is a characteristic curve for the plate spring used in the present clutch showing the resilient force as a function of the displacement of the spring; and FIGURE 4 is an elevational view similar to that of FIGURE 1 showing a modification of the clutch.

In the drawings like reference symbols indicate the same parts throughout the various views.

Figure 1:
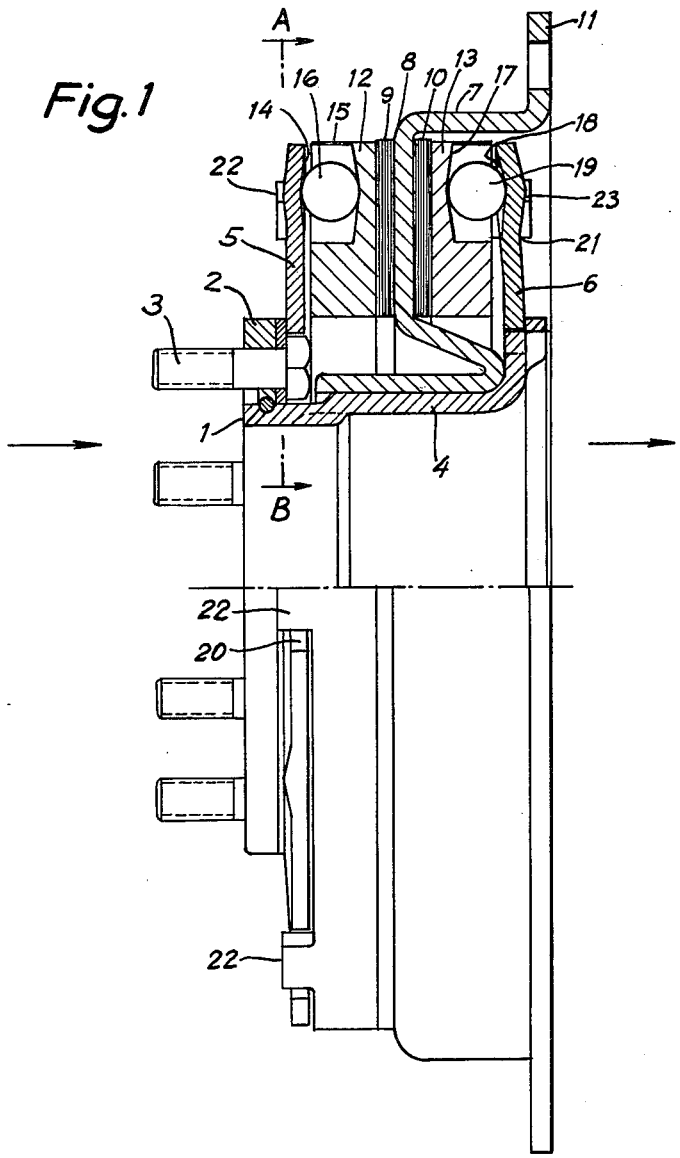
FIGURE 1 is a side elevational view of the clutch of the present invention with a portion of the clutch being shown in section.

With particular reference to FIGURES 1 and 2, the clutch of the present invention comprises a driving member 1 which has a driving flange 2 mounted thereon over the hexagonal heads of bolts 3. There is also a hub 4 upon which is fixedly mounted a plate spring 5. A second plate spring 6, having the same dimensions as the plate spring 5, is also mounted on the hub 4 for rotation therewith.

There is a driven member 7 which is rotatably mounted on the hub 4 and has a radial portion there being friction linings 9 and 10 on opposite faces of this radial portion. The driven member also carries an external flange 11.

Between the plate springs 5 and 6 and on opposite sides of the driven members radial portion 8 there is provided a pair of pressure plates 12 and 13. The pressure plates 12 and 13 are essentially annular rings which surround the hub 4 of the driving element. In the opposing faces of the plate spring 5 and pressure plate 12 there are registering recesses 14 and 15 with a rolling member, e.g. a ball 16, in each pair of recesses, the bottoms of which are formed with tangentially inclined contact surfaces.

Similarly in the opposing faces of the plate spring 6 and the pressure plate 13, there are corresponding pairs of recesses 17 and 18 in which are similarly mounted rolling elements 19.

The tangentially inclined bottoms of the recesses are so inclined with respect to the maximum force exerted by the plate springs 5 and 6 that the rolling members 16 and 19 will not ride up on the inclined bottoms until the torque transmitted to the driven member 7 exceeds 70–90% of the maximum torque to be transmitted by the clutch.

The plate springs 5 and 6 have circumferentially extending recesses 20 and 21 in the peripheries thereof while the pressure plates 12 and 13 are provided with axially extending projections 22 and 23 which extend into the recesses 20 and 21. The circumferential lengths of the projections are less than the lengths of the recesses so as to provide circumferential lost motion between the pressure plates and the plate springs by limiting the relative angular movement therebetween. The angular relationship between the recesses and projections between the plate spring 5 and pressure plate 12 is different than between the plate spring 6 and pressure plate 13, so that the lost motion is not the same on the front and rear sides of the clutch. As a result, during continued relative rotation one side of the clutch will make positive abutment before the other side.

The plate springs employed are such that they have the characteristic curve with respect to spring force and displacement as illustrated in FIGURE 3. The springs are stressed so that the initial tension thereon falls on the point A. Thus, it is apparent that the force with which the springs act upon the friction surfaces decreases as the displacement or deformation increases proceeding along the curve from point A toward point B. The horizontal distance between the points A and B constitutes the regulating path which is the region in which after passing the area of region of maximum torque, the tensions of the plate springs will vary. The distance from the point A to the point C is the summit range of the characteristic curve wherein there is substantially constant spring tension or force with varying displacement. This constant spring force compensates for wear of the friction surfaces.

The modification of FIGURE 4 is essentially similar to the clutch of FIGURES 1 and 2, except that in the modification only a single plate spring 24 is employed. The plate spring 24 is annular and has an inner opening 25 of sufficient diameter to enclose rolling members 26 which are similarly received in corresponding pairs of recesses formed in the flange 27 and a plate 28. The plate spring 24 bears against a ring-shaped pressure member 29 at its outer periphery. The pressure member 29 transmits the force of the plate spring 24 to the friction surfaces of the clutch which comprise three friction linings 30, 31 and 32. The lining 30 is mounted upon a flange 33 which is a component of one of the members of the clutch.

A cylindrical perforated sleeve 34 encloses the friction linings 31 and 32 and is secured to the pressure plate 29 by bolts 35.

The operation of the embodiment of the clutch illustrated in FIGURES 1 and 2 is as follows. All torques which are delivered by the driving flange 2 to the clutch are first transmitted through the friction lining 10 to the driven member 7. If the torque increases sufficiently to overcome the clutch engaging forces exerted by the pressures of the plate springs 5 and 5 and by the angular positions of the rolling members 15 and 19 in their recesses, the rolling members 16 and 19 will then be rolled upwardly upon the inclined bottoms of the recesses so as to cause further bending or deformation of the plate springs. Since the normal condition of the clutch is represented by the point A in FIGURE 3, the force exerted by the plate springs will decrease during the further deformation of the plate springs resulting from the rotation of the plate springs with respect to the pressure plates 12 and 13. This relative rotation is limited by the relationship between the recesses 20 and 21 and the projections 22 and 23. The end of this relative movement is represented by the point B on the spring characteristic curve in FIGURE 3, wherein the spring forces are only about 30–60% of the initial forces exerted at point A. The clutch will now slip and this slipping will occur with certainty because the clutch engaging force has now been decreased to such an extent that the friction of the clutch linings is no longer sufficient to transmit rotation.

The limit of the torque transmitted is determined by the initial force exerted by the plate springs at A on the curve and the angular displacements of the rolling members in their recesses. This limited torque is thus entirely independent of the friction of the clutch. If the static friction has been reduced by slipping of the clutch when the torque limit has been exceeded, then the rolling members 16 and 19 will return to their original positions and the clutch will revert to its initial setting. As a result of this functioning of the clutch, it can be assured that when the driving torque exceeds its limit, such as by blocking the driven member, only a fraction of the original torque will remain in effect so that the danger of overloading and damaging the clutch will be avoided. However, the original limit for the torque will be automatically restored when the applied torque has been decreased sufficiently.

Axial projections 22, 23 in conjunction with the recesses 20 and 21 also serve another purpose. If sufficient corrosion occurs so that the friction linings adhere to the pressure plates, the linings can be separated from the plates by impacting the projections against the ends of their respective recesses. In order that this action may be as gentle as possible, the angular displacements of the two plate springs are different from each other so that the impacts on the two sides of the clutch will not occur simultaneously.

As the friction linings become worn, the plate springs 5 and 6 will become less stressed and more relaxed and the plate spring will operate over the range extending between points A and C on the curve. Since in this region the forces exerted by the plate springs will remain approximately constant, the torque limit will also remain substantially constant regardless of the wear of the friction surfaces.

The mode of operation of the clutch of FIGURES 1–3 is similar to that to the modified clutch of FIGURE 4. There is no difference in the mode of operation when only one plate spring is used as in FIGURE 4, or if two plate springs are used as in FIGURES 1 and 2.

It will be understood that this invention is susceptible to modification in order to adapt it to different usages and conditions and, accordingly, it is desired to comprehend such modifications within this invention as may fall within the scope of the appended claims.

What is claimed is:

1. An overload friction clutch comprising a first rotatable member having a hub, a second rotatable member rotatably mounted on the hub and having a friction surface thereon, a rotatable pressure plate surrounding said hub and in frictional engagement with said friction surface, a disk-shaped plate spring mounted coaxially on the hub for rotation therewith, said spring operatively connected to a plate member, said plate member and said hub member having pairs of registering recesses with circumferentially inclined bottoms, and a rolling member in each pair of registering recesses in rolling engagement with the inclined bottoms thereof, said plate spring being stressed by opposed coaxial forces exerted by the hub and by the rolling members, the normal state of deformation of the spring being such that upon continued deformation by opposed coaxial forces between its inner and outer periphery the force exerted by the spring in the axial direction will diminish whereas upon relaxation of said deformation the forces will remain substantially constant.

2. The friction clutch of claim 1, in which the pressure plate and the plate spring are loosely connected to each other to permit limited relative rotation through only a small angle.

3. The friction clutch of claim 1, in which the inclinations of the bottoms of the recesses are such that the plate spring exerts its maximum force only after exceeding 70–90% of the maximum torque to be transmitted.

4. The friction clutch of claim 1, in which the rolling members are spherical.

5. An overload friction clutch comprising a first rotatable member having a hub, a second rotatable member rotatably mounted on the hub and having radial friction surfaces on opposite sides thereof, a pair of rotatable pressure plates surrounding the hub and in frictional engagement with the friction surfaces, a pair of disk-shaped plate springs mounted coaxially on the hub for rotation therewith and with the pair of pressure plates positioned coaxially with and between the springs, the opposed surfaces of the plates and springs having pairs of registering recesses therein with circumferentially inclined bottoms, and a rolling member in each pair of registering recesses in rolling engagement with the inclined bottoms thereof, said plate springs being stressed by opposed coaxial forces exerted by the hub and by the rolling members, the normal state of deformation of each spring being such that upon continued deformation by opposed coaxial forces between its inner and outer periphery the force exerted by the spring in the axial direction will diminish whereas upon relaxation of said deformation the force will remain substantially the same.

6. The friction clutch of claim 5, in which the pressure plates and the plate springs are loosely connected with each other to permit limited relative rotation between each plate and its associated spring through only a small angle.

7. The friction clutch of claim 5, in which the inclinations of the bottoms of the recesses are such that each plate spring exerts its maximum force only after exceeding 70–90% of the maximum torque to be transmitted.

8. The friction clutch of claim 5, in which the rolling members are spherical.

9. The friction clutch of claim 5, in which the inclined bottoms of the registering recesses on one side of the clutch have inclinations different from those on the other side.

10. The friction clutch of claim 6, in which the angle of relative rotation that is permitted between the pressure plate and its associated spring is different on one side of the clutch than on the other side.

References Cited by the Examiner
UNITED STATES PATENTS

| | | |
|---|---|---|
| 1,632,539 | 6/27 | Chilton. |
| 3,118,292 | 1/64 | Schroter et al. |
| 3,122,903 | 3/64 | Ramsden. |

ROBERT C. RIORDON, *Primary Examiner.*